Oct. 1, 1940.  M. A. WEST ET AL  2,216,381

SCREW

Filed Aug. 1, 1939  3 Sheets-Sheet 1

Inventors
Maxwell A. West
George E. West

By T. J. Geisler
and F. A. Geisler
Attorneys

Oct. 1, 1940. M. A. WEST ET AL 2,216,381
SCREW
Filed Aug. 1, 1939 3 Sheets-Sheet 2

Inventors
Maxwell A. West
George E. West
By T. J. Geisler
and F. L. Geisler
Attorneys Oct. 1, 1940.  M. A. WEST ET AL  2,216,381
SCREW
Filed Aug. 1, 1939   3 Sheets-Sheet 3

Inventors
Maxwell A. West
George E. West
By T. J. Geisler
and F. R. Geisler
Attorneys Patented Oct. 1, 1940

2,216,381

UNITED STATES PATENT OFFICE 2,216,381

SCREW

Maxwell A. West, Portland, and George E. West, Sherwood, Oreg., assignors of forty-nine one-hundredths to W. H. Holmes and Philip C. Smith, both of Portland, Oreg.

Application August 1, 1939, Serial No. 287,772

6 Claims. (Cl. 85—45)

This invention relates to screws, and specifically to recessed-head screws of the type adapted to be substituted in place of the familiar single-slotted screw.

Several more or less well-known forms of recessed-head screws have been introduced into the market in recent years. However, due to certain faults, difficulites in manufacture, and inconveniences in use, screws with such modified recessed heads have been found to be only partly successful, and have been adopted into general public use only to a limited extent.

The fault common to some of the recessed-head screws recently placed on the market, is that they can be used only with a special driver. The object of this invention, therefore, is to provide a screw with an improved head recess which will be suitable for use not only with a specially constructed driver, but also adapted for use with an ordinary screw driver.

With some of the modern types of screws, furthermore, reaming of the recess in the head is very likely to occur if the bit or driver, when entering the recess, is not entirely in line with the axis of the screw, or, in the case of machine-operated drivers, when the turning of the driver starts before the driver is entirely seated in the screw head recess. An object of this invention is to provide a screw in which such tendency of the driver to mar or ream the screw recess and head will be eliminated. A more specific object is to provide a recess so formed that the opposite walls will be parallel and vertical for a substantial distance with very little taper occurring for the rest of the distance for the purpose of eliminating tendency to exert up-thrust on the driver or to unseat the driver; and so to form the recess that the driver will turn the screw immediately when entering the slot of the recess, even though not seated.

Another object of this invention is to provide a screw with a recess consisting chiefly of a single wide slot, preferably wider than that ordinarily provided in the common single-slotted screw of the same size, but without weakening the screw head.

Another object of this invention is to provide a recess for a screw head of such shape and formation that the recess can be made by a punch without any tendency for the punch to distort the screw head. This particular object we accomplish by making the recess with a double concave punch so formed as to punch the metal in the axial direction of the screw.

A further object of this invention is to provide a screw and driver with the form of the recess in the screw, and the form of the tip of the driver, so made that the driver will center itself and seat itself without any marring of the recess walls or screw head, and without requiring the screw to be made with a dished head, and further, to provide such a recess that this may be accomplished even if the screw is formed with a slightly rounded head as well as with a flat head.

A still further object is to provide a screw which, while usable with an ordinary driver, will be adapted for use with the specially formed driver so constructed, with respect to the recess in the screw head, that maximum driving strength can be exerted, and that efficiency and low cost of manufacture is possible; and further, to have the specially formed driver and recess so arranged that the screw will ordinarily be held on the driver.

The manner in which we attain the above-mentioned incidental objects in our invention will be described in the following specifications with reference to the accompanying drawings.

Figure 4:
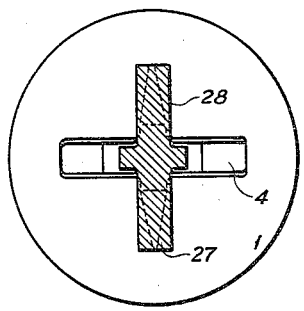
Figure 5:
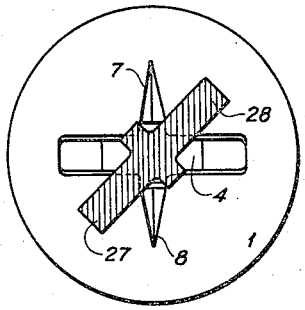
Figure 6:
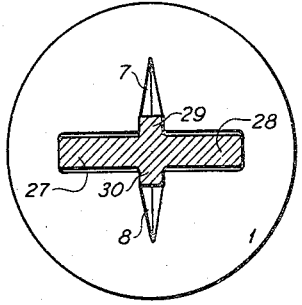
Figure 7:
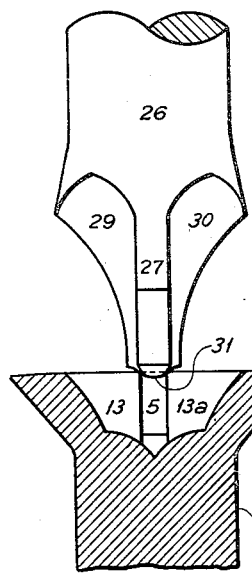
Figure 8:
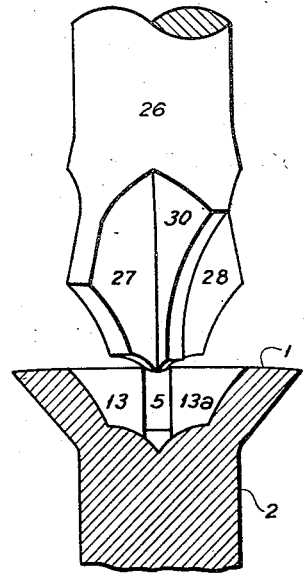
Figure 9:
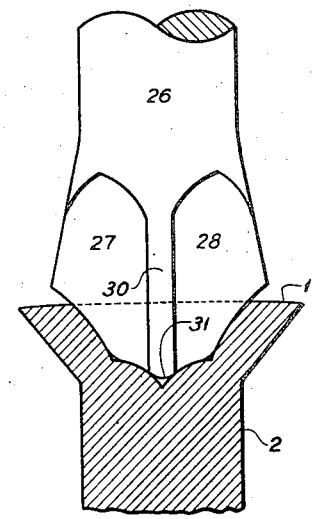
Figure 14:
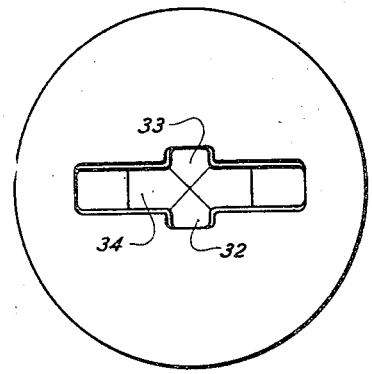
Figure 11:
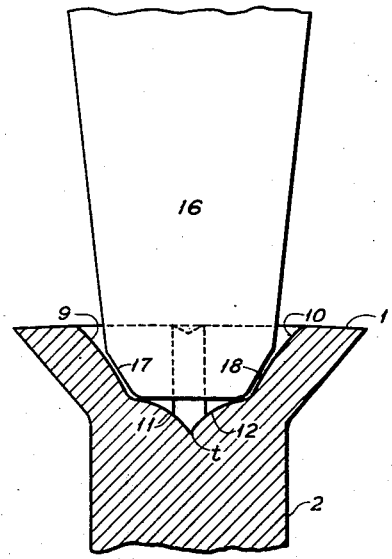
Figure 12:
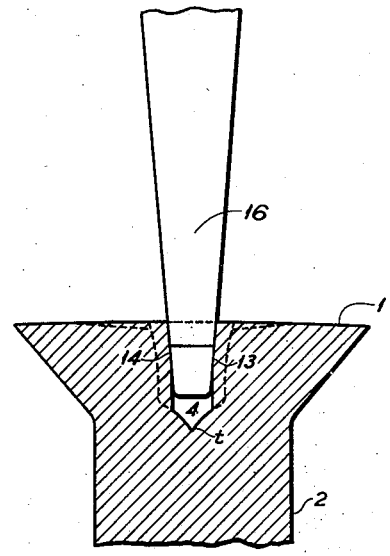
Figure 10:
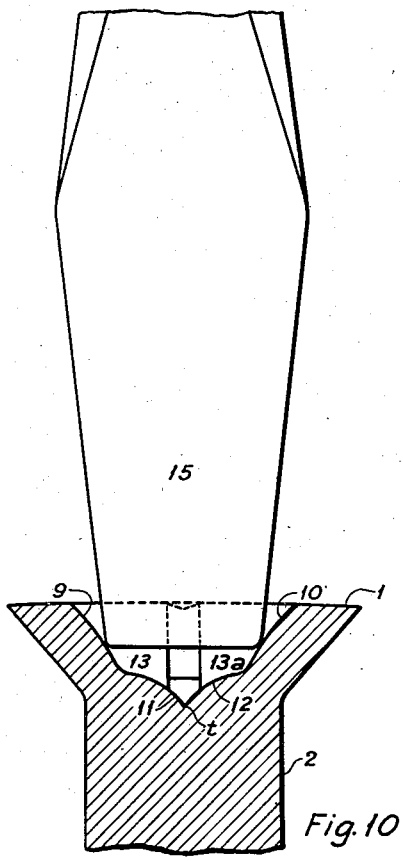
Figure 13:
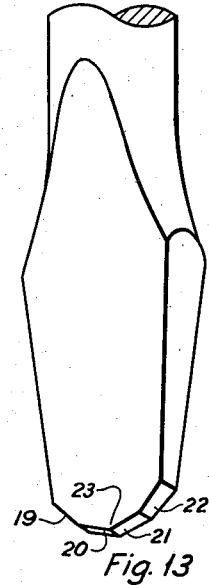

Figures 4, 5, and 6 are plan views of the same improved screw head drawn on a smaller scale than the previous figures, and showing the end of a driving tool in horizontal section and in successive stages of engagement with the recess;

Figures 7, 8 and 9 are complementary views showing the screw head in medial vertical section and the driver in elevation as it is rotated through an arc of ninety degrees;

Figure 10 is another medial vertical section of our improved screw head illustrating the use of a common screw driver in connection therewith;

Figure 11 is a similar sectional view showing the manner in which a common driver may be better adapted for use with our screw;

Figure 12 is a vertical medial section taken through the screw on a plane at right angles to that of Figures 10 and 11;

Figure 13 is a fragmentary perspective view showing a still further manner in which a common screw driver can be modified for most satisfactory use with our screw; and Figure 14 is a plan view of our screw showing a slight modification in the recess in the head.

In the drawings our invention is illustrated with reference to a substantially flat-headed screw comprising the shank 2 and head 1, but our invention may be used equally well with and is readily applicable to any type of screw, thus to a flat-headed screw or a screw with a slightly rounded head, since our invention relates particularly to the recess provided in the center of the screw head.

Figure 1:
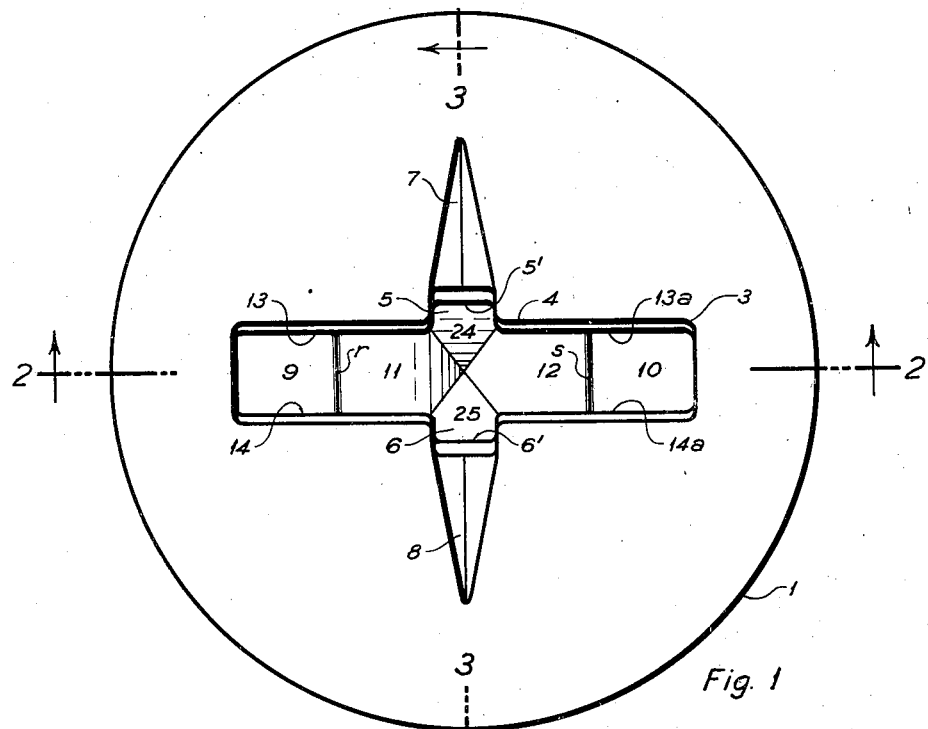
Figure 1 is a greatly enlarged plan view of a screw head in which is provided a driving recess formed in accordance with the principles of our invention.
Figure 2:
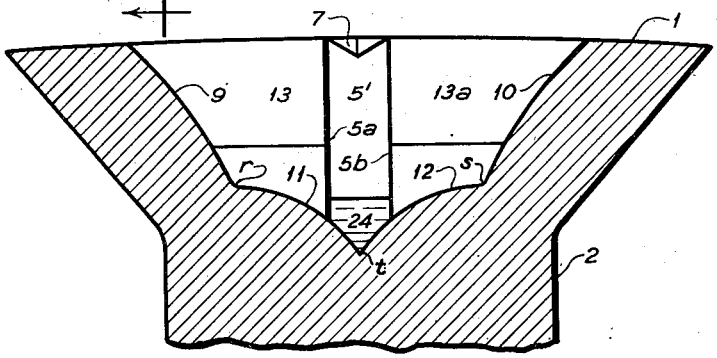
Figure 2 is a medial vertical section corresponding to the plane of line 2—2 of Fig. 1.
Figure 3:
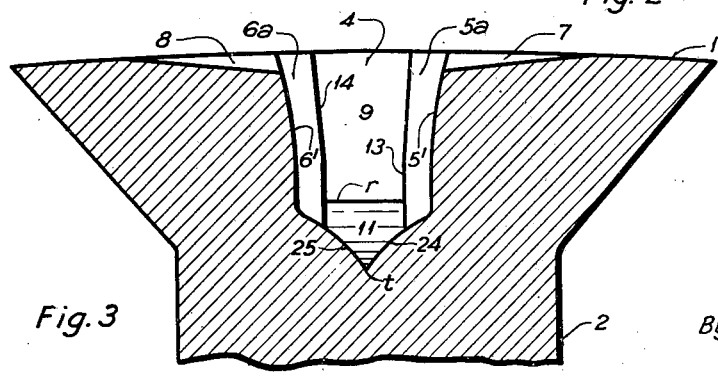
Figure 3 is a similar section taken at right angles to Figure 2 and corresponding to the plane of line 3—3 of Fig. 1.

Referring first to Figures 1, 2, and 3, the recess is indicated in general by 3, comprising a main slot 4 which intersects the vertical axis of the screw and extends a substantial distance across the face of the head of the screw. A pair of "spine" slots, 5 and 6, are centrally disposed in opposite walls of the main slot 4, and V-shaped grooves 7 and 8 lead into the "spine" slots 5 and 6 respectively in the top face of the head, all substantially as shown in the enlarged plan view constituting Figure 1.

The length of the main slot 4 is made proportionate to the diameter of the head, in all sizes of screws, and, for example, may be of a length equal to two-thirds (⅔) of the diameter. The width of the main slot 4 may be equal to or greater than the width of conventional standard slots in the common single-slotted screw. However, since the main slot 4 does not extend entirely across the head of the screw, and since the "spine" slots 5 and 6 extend such a short distance from the walls of the main slot 4, it is possible in our screw to make this main slot considerably wider than the slot of the ordinary screw, if desired, without weakening the screw head. When the main slot 4 in comparison with the diameter of the top of the head, is of the size shown in Figure 1, it will be apparent that our screw head will stand a considerably greater strain than the head of the ordinary-slotted screw in which the slot extends entirely across the head and in which, if too great a strain is provided, one-half of the top of the head will be broken off under the strain.

The end walls, 9 and 10 of the main slot 4 descend from the top face of the screw head in inwardly and downwardly curving planes, the curvature being of a large radius as indicated in Fig. 2. These downwardly curved planes merge at r and s with the bottom walls or surfaces 11 and 12, which are also inwardly curved surfaces, the slope of these bottom walls 11 and 12, however, more closely approaching the horizontal, as shown also in Figure 2. The side walls 13, 13a, and 14, and 14a, of the main slot 4 taper slightly from the top to a depth equal approximately to two-thirds (⅔) the total depth of the main slot, and below this point, the side walls are substantially vertical and parallel with each other and with the axis of the screw as apparent from Figure 3. The degree of taper in the upper portion of these side walls of the main slot 4 is made preferably to correspond to the standard taper in a common screw driver so that when the common screw driver of large size is inserted in the main slot, as shown in Figure 12, the tapered blade 15 of the driver will fit snugly in the main slot 4. Thus the upper portion of the main slot 4 will engage the end of a large screw driver which is too thick to descend to the bottom of the slot 4, while the parallel side walls at the bottom portion of the main slot 4 afford ample bearing area for blades of smaller screw drivers which are small enough to descend to the bottom of the main slot 4. These features of the main slot allow for any one of a large range of sizes of ordinary screw drivers to be used with our screw.

Referring again to Figure 1, the alined "spine" slots, 5 and 6 on opposite sides of the main slot 4, intersecting the walls 13, 13a, and 14, and 14a, of the main slot, extend preferably only a short distance at right angles to the main slot. These "spine" slots have substantially vertical end walls 5' and 6', which are curved slightly inwardly as shown in Figure 3. The bottom walls, 24 and 25 of the "spine" slots join the end walls 5' and 6', at a slightly lower level than the intersections r and s of the end walls and bottom walls of the main slot 4, as shown in Figure 2. The side walls of the "spine" slots are made parallel throughout the entire depth, as shown at 5a and 5b in Figure 2, (these walls being shown at 6a and 5a in Figure 3), in order to obtain a maximum area of contact from the "spine" portion of a special driver which we use preferably with our screw and which will be described later.

The V-shaped grooves, 7 and 8, in the top face of the screw, lead to the "spine" slots 5 and 6 respectively, and serve to guide the special driver into the recess in the manner to be explained later.

The curved formation of the bottom and end walls of the main slot 4 of the recess, is of particular importance in that the entire recess may be formed in a single punching operation with a minimum of distortion at the screw head. The punch employed performing the recess closely resembles the driver bit 26 illustrated in Figures 7 and 8, except that the tip of the punch is in the form of an inverted curved-wall pyramid with a sharp point which enters the metal of the screw and penetrates to the point t (Figures 2 and 3). The inwardly curved or concave surfaces of the wings of the punch, corresponding to the bottom surfaces 11 and 12 and 24 and 25, concentrate the force of the punch toward the vertical axis of the screw, and incidentally reduce the radial thrust which would otherwise tend to distort the screw head and to thrust it into an oval-shaped head. We have found by experiment that these concave surfaces at the end of the punch are very important in the obtaining of a substantial slot in the screw head by means of a punch and without danger of weakening the screw in any way or distorting the head. For this reason, it is possible and practical to make our screw with a recess comprising intersecting slots of different length, that is, with a main slot 4 and short "spine" slots 5 and 6, without distorting the screw, instead of having the recess composed of two intersecting slots of equal length as is the case with certain other recessed-head screws now on the market and which we have found to be less desirable. When the intersecting slots are of equal length and are both of substantial length, the screw head is weaker, especially if the slots are of substantial width, than when the recess is made with only one long slot as in our screw; but, heretofore, the making of a punched recess having a single long slot, without injury to the screw head, has been found difficult. We have also discovered that when the screw recess contains only a single long slot, there is less danger of reaming the head.

Figures 7, 8 and 9 show the tip of a specially formed driver 26 for our screw. The driver has two broad driving wings 27 and 28, in alinement with each other and adapted to fit into the main slot 4 of the recess, and two reinforcing ribs or "spines" 29 and 30, conforming to the "spine" slots 5 and 6 of the recess. In the preferred construction, the "spines" 29 and 30 and the "spine" slots 5 and 6 are considerably narrower than the driving wings 27 and 28 and the main slot 4. The bottom ends of the wings 27 and 28 and of the "spines" 29 and 30 are concave, as shown in the drawings, conforming substantially to the curved surfaces constituting the bottom of the screw recess. The extreme end of the driver is preferably formed with a small semi-spherical knob or tip 31 (Figures 7 and 9).

Figures 4, 5, and 6 and the corresponding Figures 7, 8, and 9 illustrate the setting of the driver in the recess. If the driver happens to contact the screw head to one side of the recess the V-shaped grooves 7 and 8, leading into the "spine" slots 5 and 6, will guide the rounded tip 31 of the driver into the screw recess. When the driver is then in the position, for example, shown in Fig. 4, with the driving wings 27 and 28 about 90° out of alinement with the main slot of the recess, the broad driving wings 27 and 28 cannot enter the "spine" slots or the V-shaped grooves. The concave and substantially horizontal faces at the bottoms of the driving wings 27 and 28 furthermore permit the driver to turn readily, when in contact with the screw, from the position shown in Figure 4 through the position shown in Figure 5 to the final position shown in Figure 6 without any damage to the walls of the screw recess and thus without causing any reaming of the screw. This is a very important feature of our invention. When the driving wings 27 and 28 are brought into alinement with the main slot 4 of the screw recess, the flared side walls of the main slot permit the driver to descend rapidly into the recess until the curved bottoms of the wings contact the correspondingly curved bottom surfaces of the recess. Thus when a power driver is used, with the end formed similarly to that of the driver 26 in Figures 4 to 9, we have found that it is not necessary to stop the rotation of the driver completely when changing the driver from one of our screws to another, due to the fact that there is no danger of damaging the recess or reaming the screw.

The engaging faces of the wings 27 and 28 as well as the faces of the "spines" 29 and 30 are not tapered, but are parallel respectively and vertical, as shown in Figures 7, 8, and 9. The bottoms of the side walls of the recess are also vertical, as previously mentioned, and thus ample bearing surface for the wings and "spines" of the driver is provided, even though there is no precision fit of driver and screw. In similar screws, on the market, a precision fit with a specially-formed driver is necessary, in order to prevent reaming. In our screw, due to the fact that the engaging faces of driver and recess are not tapered, any tendency of the driver to be forced out of the recess when the torque becomes great during the driving of the screw is eliminated. This fact also makes it possible for our screw to be made with a recess of less depth than that shown in the drawings and still be entirely practical. When our screw is made with a recess of the depth shown above and the flat bearing surfaces of the driver constitute substantially a precision fit with the vertical portions of the side walls, the screw can be held on the end of the driver when the screw is to be placed, facilitating the handling of screws in inaccessible places. This is not possible with screws which can be driven only with drivers having bearing surfaces which are considerably tapered throughout.

In Figure 10, we show how an ordinary screw driver 15, without any modification whatever, may be used in our screw, the thickness and taper of the blade of an ordinary driver, of the size ordinarily used for a given range of sizes of conventional single-slotted screws, corresponding to the width and taper in the upper portion of the main slot of the screw recess. Furthermore, by merely grinding or filing off the corners at the end of a common screw driver, as shown in the blade 16 of the screw driver in Fig. 11, the blade can be made to bottom in the main slot of the recess as illustrated in Figure 11, and the edges 17 and 18 of the common screw driver can be easily filed so as to be substantially parallel to the curved end-walls 9 and 10 respectively, of the slot, thus enabling the blade of the screw driver to cover substantially the full bearing area of the side walls of the slot. The same principle of modifying the end of a common screw driver to suit the contour of the main slot of the recess may be carried still further by filing the end of the screw driver to provide four bottom edges, instead of the single bottom edge as illustrated by the edge faces 19, 20, 21 and 22 formed on the screw driver blade shown in Figure 13. The tip of the ordinary screw driver modified in this way conforms even more closely to the curved bottom surfaces of the slot, and the resulting V-shaped bottom edge 23 enables the screw driver to descend still deeper into the slot recess, and also provides a self-centering action, should the screw driver blade be considerably smaller, in comparison with the size of the slot, than the screw driver illustrated.

Thus our improved screw is in effect a modified form of a conventional single-slotted screw not only in that the recess comprises chiefly a single-slot of adequate width with walls substantially vertical, but also because our screw can be driven satisfactorily with an ordinary screw driver as explained.

In Figure 1, the "spine" slots 5 and 6 are shown considerably narrower than the main slot 4 and this we regard as the preferred form of our screw recess. Similarly, the special driver 26, illustrated in Figures 7, 8, and 9 has the "spines" 29 and 30 made thinner than the driving wings 27 and 28. However, it is possible to make the "spine" slots of the same width as the main slot and this modification is illustrated in Figure 14 in which it will be noted that the "spine" slots 32 and 33 correspond in width to the main slot 34. This modification of the recess may make possible some economy of the manufacture of the special driver. Also the V-shaped lead-in grooves may be omitted in the face of the screw. Other modifications in the recess of our screw will suggest themselves and various modifications would be possible without departing from the principles of our invention.

We claim:

1. In a screw head a recess comprising, a centrally-spaced main slot terminating short of the periphery of said screw head, the side walls of said main slot being vertical and parallel for a substantial distance from the bottom of said slot, the intersections of the bottom of said main slot with said side walls being parallel and the intersections of said side walls with the top face of the screw being parallel, the end walls of said main slot sloping downwardly and inwardly, the bottom of said main slot comprising a pair of convex surfaces extending from the bottom of said end walls respectively to the center of said screw and converging on the screw axis, and a pair of spine slots bisecting the side walls of said main slot and extending at right angles to said main slot, said spine slots terminating at considerably less distance from the axis of said screw than said main slot, the bottoms of said spine slots sloping downwardly and inwardly, extending from the bottom of the end walls of the spine slots to the center of the screw and meeting the converging bottom surfaces of said main slot at a point located on the screw axis.

2. In a screw head a recess comprising, a centrally-spaced main slot terminating short of the periphery of said screw head, the side walls of said main slot being vertical and parallel for a substantial distance from the bottom of said slot, said side walls flared outwardly at the top, the intersections of the bottom of said main slot with said side walls being parallel and the intersections of said side walls with the top face of the screw being parallel, the end walls of said main slot forming downwardly extending convex surfaces, the bottom of said main slot comprising a pair of convex surfaces extending from the bottom of said end walls respectively to the center of said screw and converging on the screw axis, and a pair of spine slots bisecting the side walls of said main slot and extending at right angles to said main slot, said spine slots terminating at considerably less distance from the axis of said screw than said main slot, the end walls of said spine slots extending vertically upward for a substantial distance from the bottoms of said spine slots, the bottoms of said spine slots sloping downwardly and inwardly, extending from the bottom of the end walls of the spine slots to the center of the screw and meeting the converging bottom surfaces of said main slot at a point located on the screw axis, and V-shaped grooves in the top surface of said screw head, diametrically opposite each other, beginning at points within the perimeter of said screw head and leading into the ends of said spine slots respectively.

3. The combination described in claim 2 with the radius of curvature of the convex surfaces constituting said bottom of said slot being less than the radius of curvature of said convex end walls.

4. In a screw head a recess comprising, a centrally-spaced main slot terminating short of the periphery of said screw head, the side walls of said main slot being vertical and parallel for a substantial distance from the bottom of said slot, said side walls flared outwardly at the top, said flare conforming substantially to the taper of an ordinary screw-driver blade, the intersections of the bottom of said main slot with said side walls being parallel and the intersections of said side walls with the top face of the screw being parallel, the end walls of said main slot sloping downwardly and inwardly, the bottom of said main slot comprising a pair of convex surfaces extending from the bottom of said end walls respectively to the center of said screw and converging on the screw axis, and a pair of spine slots bisecting the side walls of said main slot and extending at right angles to said main slot, said spine slots terminating at considerably less distance from the axis of said screw than said main slot, the end walls of said spine slots being parallel respectively to the side walls of said main slot, the bottoms of said spine slots formed into downwardly sloping convex surfaces, extending from the bottom of the end walls of the spine slots to the center of the screw and meeting the converging bottom surfaces of said main slot at a point located on the screw axis.

5. In a screw head a recess comprising, a centrally-spaced main slot terminating short of the periphery of said screw head, the side walls of said main slot being vertical and parallel for a substantial distance from the bottom of said slot, said side walls flared outwardly at the top, said flare conforming substantially to the taper of an ordinary screw-driver blade, the intersections of the bottom of said main slot with said side walls being parallel and the intersections of said side walls with the top face of the screw being parallel, the end walls of said main slot forming downwardly extending convex surfaces, the bottom of said main slot comprising a pair of convex surfaces extending from the bottom of said end walls respectively to the center of said screw and converging on the screw axis, and a pair of spine slots bisecting the side walls of said main slot and extending at right angles to said main slot, said spine slots terminating at considerably less distance from the axis of said screw than said main slot, the end walls of said spine slots extending vertically upward for a substantial distance from the bottoms of said spine slots, the bottoms of said spine slots formed into downwardly sloping convex surfaces, extending from the bottom of the end walls of the spine slots to the center of the screw and meeting the converging bottom surfaces of said main slot at a point located on the screw axis, the side walls of said spine slots being vertical and straight throughout their entire extent, and V-shaped grooves in the top surface of said screw head, diametrically opposite each other, beginning at points within the perimeter of said screw head and leading into the ends of said spine slots respectively.

6. In a screw head a recess comprising, a centrally-spaced main slot terminating short of the periphery of said screw head, the length of said main slot being approximately two-thirds the length of the diameter of the top face of said head, the side walls of said main slot being vertical and parallel for a substantial distance from the bottom of said slot, said side walls flared outwardly at the top, the intersections of the bottom of said main slot with said side walls being parallel and the intersections of said side walls with the top face of the screw being parallel, the end walls of said main slot forming downwardly extending convex surfaces, the bottom of said main slot comprising a pair of convex surfaces extending from the bottom of said end walls respectively to the center of said screw and converging on the screw axis, the radius of curvature of the convex surfaces constituting said bottom of said slot being less than the radius of curvature of said convex end walls, and a pair of spine slots bisecting the side walls of said main slot and extending at right angles to said main slot, said spine slots being narrower than said main slot and terminating at considerably less distance from the axis of said screw than said main slot, the end walls of said spine slots being parallel respectively to the side walls of said main slot, the bottoms of said spine slots formed into downwardly sloping convex surfaces, extending from the bottom of the end walls of the spine slots to the center of the screw and meeting the converging bottom surfaces of said main slot at a point located on the screw axis, the side walls of said spine slots being vertical and straight throughout their entire extent.

MAXWELL A. WEST.
GEORGE E. WEST.